United States Patent [19]

Jerhammar

[11] Patent Number: 4,512,087
[45] Date of Patent: Apr. 23, 1985

[54] NAVIGATIONAL AID DEVICE

[76] Inventor: Lars O. Jerhammar, Bråddgatan 1Y, 60222 Norrköping, Sweden

[21] Appl. No.: 570,346

[22] Filed: Jan. 13, 1984

[51] Int. Cl.³ .............................................. B43L 5/00
[52] U.S. Cl. ...................................... 33/431; 33/435; 33/457
[58] Field of Search .................. 33/1 C, 457, 431, 435

[56] References Cited

U.S. PATENT DOCUMENTS

| | | | |
|---|---|---|---|
| 1,808,359 | 6/1931 | Lewis | 33/431 |
| 2,942,347 | 6/1960 | Kuhn | 33/435 |
| 3,625,417 | 12/1971 | Slauter | 33/435 |
| 3,844,041 | 10/1974 | Wilson, Jr. | 33/431 |
| 4,213,248 | 7/1980 | Jerhammar | 33/431 |
| 4,359,628 | 11/1982 | Lambert | 33/431 |

Primary Examiner—Willis Little
Attorney, Agent, or Firm—McAulay, Fields, Fisher, Goldstein & Nissen

[57] ABSTRACT

A navigational aid device of the type comprising a disc supporting a map, especially a chart, a protractor being movable over said map, a first carrier movable in the longitudinal direction of said disc, and a second carrier which is movable on said first carrier and in the transversal direction of said disc and upon which said protractor is rotatably journalled. Said first carrier consists of at least one ruler extending across said disc and situated upon said map and sliding means situated between said map and said disc and connected to said at least one ruler, said sliding means being provided with at least one guide member movable along track means provided on and extending longitudinally of said disc.

20 Claims, 4 Drawing Figures

NAVIGATIONAL AID DEVICE

The present invention is related to a navigational aid device of the type comprising a disc supporting a map, especially a chart, a protractor being movable over said map, a first carrier movable in the longitudinal direction of the disc, and a second carrier which is movable on the first carrier and in the transversal direction of the disc and upon which the protractor is rotatably journalled.

Such a navigational aid device is shown and described in the Swedish Pat. No. 409,620. When using the previously known device it is troublesome to change charts and it is also difficult to fix the chart in a position to be held firmly in position at quick movements, e.g. when the device is placed down on a floor or ground with force against its edge.

An object with the invention is to provide a navigational aid device of the type named above, which device will set the drawbacks with previously known devices aside and which device is easy to handle, holds the map firmly and secure in its position, and is umcomplicated according to its constructions and function. The device can with advantage be used except for charts even for maps used in track-finding, flying navigation and similar occasions when courses are to be determined on a map.

This object is achieved according to the invention by a navigational aid device in which the first carrier consists of at least one ruler extending across the disc and situated upon the map and sliding means situated between the map and the disc and connected to the at least one ruler, the sliding means being provided with at least one guide member movable along track means provided on and extending longitudinally of said disc.

The invention will now be more closely explained with reference to the accompanying drawings, in which FIG. 1 shows a plane view of a first embodiment of a navigational aid device according to the invention, FIG. 2 shows a view similar to that in FIG. 1 but with a chart placed on the navigational aid device.

Figure 1:
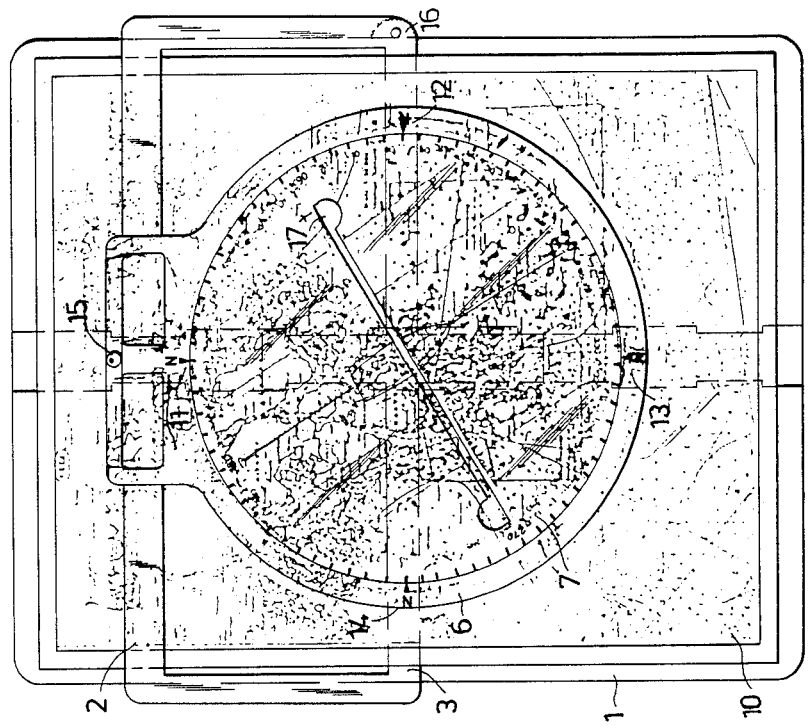
Figure 2:
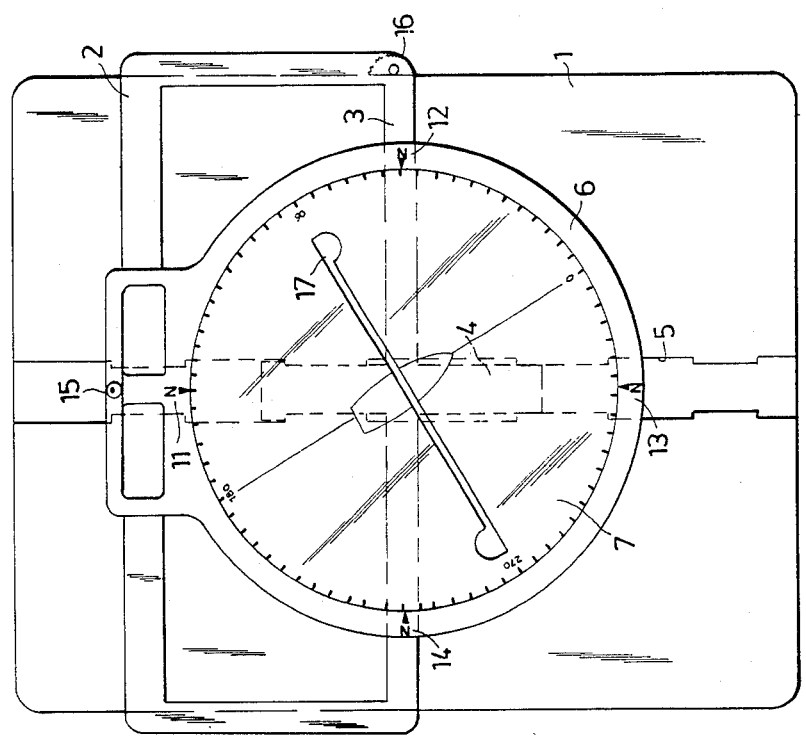

In FIGS. 1 and 2 a navigational aid device according to the invention is shown, FIG. 1 showing the device without and FIG. 2 with a chart in position. The navigational aid device comprises a disc 1 which is plane and substantially rectangular, a first carrier consisting of, on one hand, an upper ruler 2 which is provided on and movable along the disc, and, on the other hand, a sliding part 3 which at its ends is connected to the ends of the ruler 2 and which has guide means movable in a track 5 in the disc 1, a second carrier 6 provided on said upper ruler 2 and movable in the cross-direction of the disc, and a protractor 7 rotatably journalled on the second carrier 6. Within the scope of the present invention the first carrier 2, 3 can be movable in the longitudinal direction of the disc and the second carrier 6 in the transversal direction of the disc.

Further, the chart is placed in an envelope of flexible, transparent plastics fastened at the upper edge of the disc. The lower edge of the envelope is overlapping the lower edge of the disc and is detachably fastened on the backside of the disc. Of course, the envelope can be held firmly in other ways within the scope of the invention. It is of great importance that the chart is held firmly against rotational movements in relation to said disc 1. The chart need not to be placed in an envelope, but can be placed directly on the disc, e.g. using charts which have been covered in advance with plastics. In this case, fastening means for this purpose can be provided on the upper or lower edge sides of the disc.

In FIG. 2 a chart is placed on the disc between the sliding part 3 and the ruler 2 of said first carrier.

The second carrier 6 is provided with four northern-markings in the form of an "N". These markings "N" are provided at 11, 12, 13 and 14 in FIG. 1. The purpose thereof is that the positioning of the chart on the navigational aid device can be varied so that the northern marking "N" is used which corresponds to the northern position of the chart. It is to be noted that the scale of the protractor 7 is made so that the scale numbers increase clockwise thereon.

Also, before the chart is placed upon the device, depending upon the weather, it can be introduced in a separate envelope of plastics.

A stop means 15 is provided on said second carrier. This stop means firmly locks the first carrier 2, 3 and the second carrier 6 in relation to each other by means of a simple manipulation. Moreover, a locking member 16 is provided to firmly lock the first carrier 2 on the disc.

A recess 17 is provided on the protractor 7 by means of which one can easily grip the same and turn it to the desired position.

Figure 3:
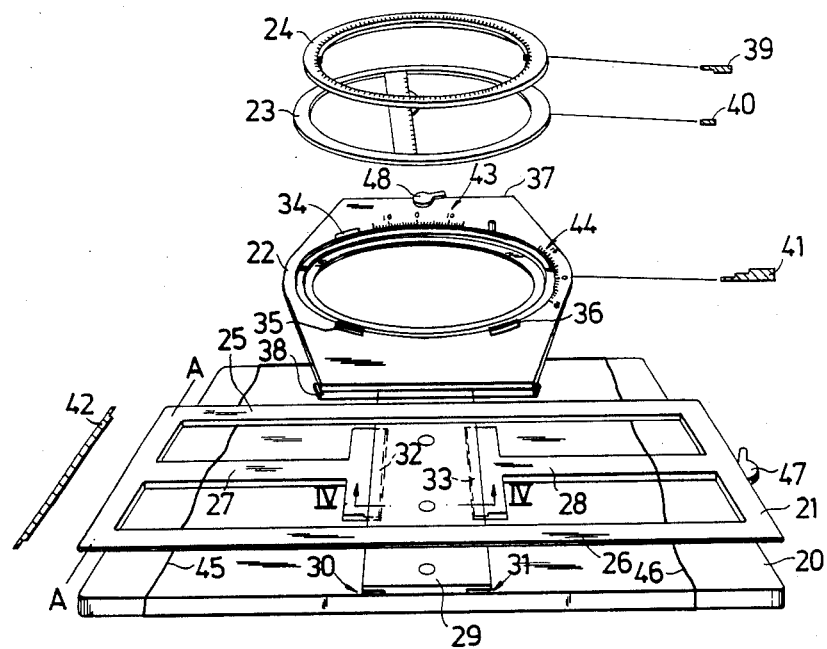
FIG. 3 shows an exploded view of a second embodiment of the navigational aid device.
Figure 4:
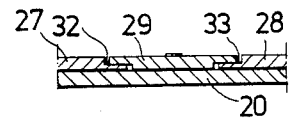
FIG. 4 shows partially a sectional view taken on lines IV—IV in FIG. 3.

In FIGS. 3 and 4 a second embodiment of the navigational aid device according to the invention is shown, comprising a disc 20, a first carrier 21 movable in the longitudinal direction of and upon the disc, a second carrier 22 movably connected to the first carrier 21 to be moved in the transversal direction of the disc 20, and first and second protractor parts 23 and 24, respectively, being rotatably journalled on the second carrier 22. The first carrier 21 comprises two rulers 25 and 26, respectively, between which sliding members 27 and 28, respectively, are provided. In the centre of the disc and in the longitudinal direction thereof a plate 29 is fastened, in such a way that tracks are provided at the longitudinal edges thereof at 30 and 31, respectively. The sliding members 27 and 28 each being provided with guide edges 32 and 33, respectively, at the inner ends thereof, the guide edges being introduced in the tracks 30 and 31 so that the first carrier can be in the longitudinal direction of the disc.

The second carrier 22 which consists of a plate with a circular hole in the middle thereof is intended to receive the rings 23 and 24 defining the protractor. Those rings 23 and 24 are held in place by holders 34, 35 and 36. Further, the second carrier has two parallel edges 37 and 38 which are bent so as to define parallel channels on the under side of the carrier receiving the outer edges of the rulers 25, 26 of the first carrier 21 to provide for the transversal reciprocating movement thereof.

In FIG. 3 some sectional views 39, 40, 41 and 42 are shown to make the sectional areas of the rings 23, 24, the second carrier 22 and the first carrier 21 clear.

In FIG. 4 it is shown how the guide edges 32, 33 of the sliding members 27 and 28, respectively, are received in the tracks 30, 31 between the plate 29 and the disc 20.

In this embodiment two rings 23, 24 are provided instead of the ring 7 in the first embodiment due to the fact that the second embodiment is formed to take deviation from the true North into consideration. For this purpose the second carrier 22 is provided with scales 43 and 44.

The position of the map or the envelope which shall receive the map is schematically shown by means of the curved lines 45, 46 in FIG. 3.

A stop means 47 is provided to firmly lock the first carrier in relation to the disc, and another stop means 48 is provided to firmly lock the position of the second carrier 2 in relation to the first carrier.

The navigational aid device according to the invention is of course not limited to the shape of the parts shown on the drawings, but the first carrier, the second carrier and other details can be formed in other ways within the scope of the present invention. For example, the first carrier can be detachable in two or more parts which by means of an easy motion can be disassembled or assembled. What is claimed is:

1. A navigational aid device of the type comprising a disc supporting a map, especially a chart, a protractor being movable over said map, a first carrier movable in the longitudinal direction of said disc, and a second carrier which is movable on said first carrier and in the transversal direction of said disc and upon which said protractor is rotatably journalled, wherein:

said first carrier consists of at least one ruler extending across said disc and situated upon said map;

sliding means situated between said map and said disc and connected to said at least one ruler, track means provided on and extending longitudinally of said disc, said sliding means being provided with at least one guide member movable along said track means for preventing transversal displacement of said first carrier; and said second carrier including at least two scales to take deviation from the true North into consideration.

2. The device according to claim 1, wherein said second carrier includes a plate with a circular recess and rotatable therein in said recess at least one ring having protractor markings.

3. The device according to claim 2, including fastening means for fastening the position of said first carrier to said second carrier and stop means to lock said first carrier to said disc.

4. The device of claim 2, including fastening means for fastening said first carrier to said second carrier to firmly lock the position of said second carrier in relation to said first carrier.

5. The device according to claim 1, wherein said second carrier includes two rings rotatable therein, and one of said rings having protractor markings.

6. The device according to claim 1, wherein said first carrier includes two spaced rulers, and said sliding means includes a sliding member positioned between said two spaced rulers.

7. The device according to claim 6, wherein said second carrier includes two parallel edges bent to form parallel channels on the underside of the carrier for receiving outer edges of said rulers.

8. The device according to claim 1, wherein said sliding means includes a sliding member having at least one end connected to said at least one ruler.

9. The device according to claim 1, wherein said sliding means includes two sliding members.

10. The device according to claim 1, wherein said first carrier includes two rulers extending across said disc, and said sliding means includes two sliding members, at least one of said sliding members having one end connected between and to said two rulers.

11. The device according to claim 1, including plate means juxtaposed to said disc and forming said track means therebetween for guiding said sliding means.

12. The device according to claim 1, including first stop means locking the first carrier to said disc, second stop means locking said second carrier relative to said first carrier.

13. The device according to claim 1, wherein said second carrier includes two spaced parallel channels, edges of said first carrier being received in said parallel channels for controlling the sliding of said second carrier relative to said first carrier.

14. A navigational aid device of the type comprising a disc supporting a map, especially a chart, a protractor being movable over said map, a first carrier movable in the longitudinal direction of said disc, and a second carrier which is movable on said first carrier and in the transversal direction of said disc and upon which said protractor is rotatably journalled, wherein:

said first carrier consists of at least one ruler extending across said disc and situated upon said map;

sliding means situated between said map and said disc and connected to said at least one ruler, track means provided on and extending longitudinal of said disc, said sliding means being provided with at least one guide member movable along said track means for preventing transversal displacement of said first carrier; and said second carrier including at least one scale to take deviation from the true North into consideration.

15. The device according to claim 14, wherein said second carrier includes at least two scales to take into account the deviation, and at least one clear protractor rotatable therein.

16. The device according to claim 14, wherein said sliding means includes a sliding part having ends connected to the ends of said at least one ruler.

17. A navigational aid device of the type comprising disc means supporting a map, especially a chart, a protractor being movable over said map, a first carrier movable in the longitudinal direction of said disc means, and a second carrier which is movable on said first carrier and in the transversal direction of said disc means and upon which said protractor is rotatably journalled, wherein:

said first carrier consists of at least one ruler extending across said disc means and situated upon said map;

sliding means situated between said map and said disc means and connected to said at least one ruler, said track means for preventing transversal displacement of said first carrier said sliding means being provided with at least one guide member movable along track means provided on and extending longitudinally of said disc means;

said second carrier including thereon at least two scales to take deviation from the true North into consideration, said second carrier further including therein a circular recess; and at least one ring having protractor markings thereon rotatable in said recess.

18. The device according to claim 17, including plate means juxtaposed to said disc means and forming said track means therebetween for guiding said sliding means.

19. The device according to claim 18, wherein said first carrier includes two spaced rulers, and said sliding means includes a sliding member positioned between said two spaced rulers.

20. The device according to claim 19, including fastening means for fastening the position of said first carrier to said second carrier and stop means to lock said first carrier to said disc means.

* * * * *

UNITED STATES PATENT AND TRADEMARK OFFICE
CERTIFICATE OF CORRECTION

PATENT NO. : 4,512,087
DATED : April 23, 1985
INVENTOR(S) : Lars JERHAMMAR

It is certified that error appears in the above—identified patent and that said Letters Patent is hereby corrected as shown below:

Column 4, line 46, delete "said" (second occurence);

Column 4, line 47, after "means" insert --provided on and extending longitudinally of said disc,--;

Column 4, line 50, after "along" insert --said--;

Column 4, lines 50-51, delete "provided on and extending longitudinally of said disc means" and insert --for preventing transversal displacement of said first carrier--.

Column 4, lines 47-48, delete "for preventing transversal displacement of said first carrier".

Signed and Sealed this

Third Day of June 1986

[SEAL]

Attest:

DONALD J. QUIGG

Attesting Officer

Commissioner of Patents and Trademarks